United States Patent
Luschi et al.

(10) Patent No.: US 8,126,451 B2
(45) Date of Patent: *Feb. 28, 2012

(54) SYNCHRONOUS CDMA COMMUNICATION SYSTEM

(75) Inventors: Carlo Luschi, Oxford (GB); Steve Allpress, Bristol (GB); Philip Jones, Swindon (GB)

(73) Assignee: Icera, Inc., Wilmington, DE (US)

( * ) Notice: Subject to any disclaimer, the term of this patent is extended or adjusted under 35 U.S.C. 154(b) by 994 days.

This patent is subject to a terminal disclaimer.

(21) Appl. No.: 12/016,663

(22) Filed: Jan. 18, 2008

(65) Prior Publication Data

US 2009/0111461 A1    Apr. 30, 2009

(30) Foreign Application Priority Data

Oct. 31, 2007   (GB) .................................. 0721423.2

(51) Int. Cl.
*H04W 4/00* (2009.01)

(52) U.S. Cl. .................. 455/422.1; 455/423; 455/67.11; 455/446; 455/131; 375/316; 375/232; 375/341; 375/343; 375/350; 370/208; 370/204; 370/209; 370/232; 370/252

(58) Field of Classification Search ............... 455/422.1, 455/423, 67.11, 446, 130, 115.1, 131; 375/316, 375/232, 341, 343, 350; 370/208, 204, 209, 370/232, 252

See application file for complete search history.

(56) References Cited

U.S. PATENT DOCUMENTS

| | | | |
|---|---|---|---|
| 5,893,035 A * | 4/1999 | Chen .............................. | 455/522 |
| 7,577,190 B2 * | 8/2009 | Denk et al. ..................... | 375/224 |
| 2002/0105928 A1 | 8/2002 | Kapoor et al. | |
| 2005/0277425 A1 | 12/2005 | Niemela et al. | |
| 2006/0063505 A1 * | 3/2006 | Cairns ........................... | 455/302 |
| 2008/0165904 A1 * | 7/2008 | Sidi et al. ....................... | 375/345 |
| 2010/0008244 A1 | 1/2010 | Sampath et al. | |

FOREIGN PATENT DOCUMENTS

| | | |
|---|---|---|
| EP | 1921757 A1 | 5/2008 |
| WO | 9908460 A2 | 2/1999 |
| WO | 0223742 A2 | 3/2002 |
| WO | 2007091908 A1 | 8/2007 |

OTHER PUBLICATIONS

Environment-Adaptive Receiver: A Performance Prediction Approach; pp. 5709-5714; IEEE 2006.

(Continued)

*Primary Examiner* — Kamran Afshar
*Assistant Examiner* — Yousef Rod

(57) ABSTRACT

Methods are described of processing signals received over a wireless communication channel by a receiver in a wireless cellular network. A method includes receiving a sequence of signal samples. The received sequence of samples can be used to estimate at least one channel coefficient for at least one transmission path. An estimate of an orthogonality factor can be generated based on said at least one channel coefficient. An estimate of the disturbance can be generated based on said at least one estimated channel coefficient. An estimate of input signal power can be generated using the received sequence. An estimate of cell geometry can be generated using the estimated orthogonality factor, estimated disturbance, and estimated input signal power. The estimate of cell geometry can be used in processing received data samples. Related methods of processing digital samples are described. Related receivers are also described.

16 Claims, 3 Drawing Sheets

OTHER PUBLICATIONS

Average Orthogonality Factor in WCDMA Downlinks for Independent Rayleigh Fading Multipath Channels; pp. 1213-1217; IEEE 2007.

Characterizing the Orthogonality Factor in WCDMA Downlinks; pp. 621-625; IEEE 2003.

Klein, A., *Data detection algorithms specially designed for the downlink of CDMA mobile radio systems*, IEEE Vehicular Technology Conference, Vo. 1, May 1997, pp. 203-207.

Hooli, K., et al., *Performance evaluation of adaptive chip-level channel equalizers in wcdma downlink.*

\* cited by examiner

SYNCHRONOUS CDMA COMMUNICATION SYSTEM

This application claims priority to GB Application No. 0721423.2, filed 31 Oct. 2007, the contents of which are incorporated herein by reference in its entirety.

This invention relates to a cellular communications system, particularly but not exclusively a synchronous Code Division Multiple Access (CDMA) system.

As is well known, a cellular communications system includes mobile radio receiver devices which can communicate with each other via base stations in the system. The system is set up as a cellular network, with each base station serving one or more cells depending on the cell structure. The mobile radio receiver devices include analog radio frequency (RF)/intermediate frequency (IF) stages which are arranged to receive and transmit wireless signals carrying data via one or more antennas. The output of the RF/IF stages is typically converted to baseband, where an analog to digital converter (ADC) converts incoming analogue signals to digital samples, which are then processed for signal detection and decoding of the data, e.g. in the form of logical values. The analog to digital converter may alternatively operate directly at IF, in which case the conversion to baseband is performed in the digital domain. A number of different types of front end processing of the digital samples are known to implement signal detection, including rake receiver processing and channel equalization processing.

In code division multiple access wireless systems, different physical channels are multiplexed in the code domain using separate spreading sequences. In the case of orthogonal spreading code words, the original data symbols can then be effectively separated at the receiver by despreading. In a wideband CDMA (WCDMA) cellular system, downlink code multiplexing is performed using orthogonal variable spreading factor (OVSF) codes. However, the OVSF code words are orthogonal to each other only under the condition of perfect time alignment. In the presence of multi-path propagation, the code orthogonality is lost and the operation of despreading is effected by multiple access interference (MAI).

Conventional CDMA receivers based on rake processing (as described for example in J. G. Proakis, "Digital Communications", published by McGraw & Hill, 1995) are subject to performance degradation due to loss of orthogonality between channelization codes in the presence of multi-path propagation. For synchronous CDMA transmission, as in the case of the forward link of the third generation partnership project (3GPP) WCDMA standard, an effective approach to solve this problem is to use a chip level channel equalizer (for example as described in the paper by A. Klein "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207). The use of channel equalization processing generally produces a significant performance advantage over conventional rake processing, but at the cost of an increased implementation complexity.

The performance advantage provided by chip level equalization is especially important for high data rate transmission, as in the case of the 3GPP high speed downlink packet access (HSDPA) standard.

The computation of the equalizer coefficients for implementing equalizer processing can be based on the minimization of the Mean-Square Error (MSE) at the equalizer output. In principle, this can be achieved by block processing, as mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207, or by means of an adaptive algorithm as mentioned in K. Hooli, M. Latva-aho and M. Juntti, "Performance Evaluation of Adaptive Chip-Level Channel Equalizers in WCDMA Downlink", in Proceedings of IEEE International Conference on Communications, vol. 6, Helsinki, Finland, June 2001, pp. 1974-1979. In the case of a synchronous CDMA receiver, the application of adaptive processing based on, e.g., a Normalized Least Mean-Square (NLMS) updating rule of the equalizer coefficients suffers from the non-orthogonality of the downlink codes in the presence of multi-path. This results in a relatively large error signal, which requires a small adaptation step size to provide sufficient averaging, and hence slows down convergence as discussed in Hooli et al., above.

Moreover, the inventors have realised that channel equalization may not be able to provide superior performance at low signal to interference-plus-noise ratios. One aim of the present invention is to provide a technique for estimation of the wireless receiver operating conditions, which is useful to establish whether it is better to perform rake processing or equalizer processing.

A more general aim of the invention is to provide a robust estimation technique for providing information about signal-to-disturbance ratios in a wireless network.

According to one aspect of the present invention there is provided a method of processing signals received over a wireless communication channel by a receiver in a wireless cellular network, the method comprising:

receiving a sequence of signal samples;

using the received sequence of samples to estimate at least one channel coefficient for at least one transmission path;

generating an estimate of an orthogonality factor ($\beta$) based on said at least one channel coefficient;

generating an estimate of the disturbance ($\sigma_i^2$) on said at least one estimated channel coefficient;

generating an estimate of input signal power ($\sigma_o^2$) using the received sequence;

using the estimated orthogonality factor, estimated disturbance and estimated input signal power to generate an estimate of cell geometry; and using the estimate of cell geometry in processing received data samples.

A channel coefficient can relate to a single transmission path or to multiple paths with approximately equal delays (such that a transmitted symbol arrives at a common sampling time via different routes).

Another aspect of the invention provides a method of processing digital samples in a cellular wireless network, the method comprising:

receiving a sequence of samples corresponding to symbols transmitted in a single in a cell of the wireless network;

using said received sequence to generate an estimate of cell geometry, being an estimate of the ratio between received signal power of signals of that cell and disturbance power where disturbance power is a measure of disturbance introduced from signals of other cells and noise; and using said estimate of cell geometry to select one of a plurality of processing routines for processing the digital samples.

A further aspect of the invention provides a receiver for use in a wireless cellular network comprising:
  means for receiving a sequence of signal samples;
  means for estimating at least one channel coefficient from the received sequence of samples for at least one transmission path of the signal;
  means for generating an estimate of cell geometry, said cell geometry estimation means being operable to:
  generate an estimate of an orthogonality factor ($\beta$) based on said at least one channel coefficient;
  generate an estimate of the disturbance ($\sigma_i^2$) on said at least one estimated channel coefficient;
  generate an estimate of input signal power ($\sigma_o^2$) using the received sequence;
  to generate an estimate of cell geometry using the estimated orthogonality factor, estimated disturbance and estimated input signal power; and
  means for using the estimate of cell geometry to process received data samples.

A further aspect of the invention provides a receiver for use in a wireless cellular network for processing digital samples, the receiver comprising:
  a processor arranged to receive a sequence of digital samples corresponding to symbols transmitted in a cell of the wireless network and for implementing a cell geometry estimation routine which uses the received sequence to generate an estimate of cell geometry, being an estimate of the ratio between received signal power of signals of that cell and disturbance power where disturbance power is a measure of disturbance introduced from signals of other cells and noise, and one of a plurality of processing routines for processing the digital samples;
  a memory holding said plurality of processing routines;
  wherein the processing implements a routine which uses said estimate of cell geometry to select one of the plurality of processing routines in the memory for processing the digital samples.

A mobile terminal including a wireless interface for receiving an analog signal and operable to convert the analogue signal into digital samples for use by the receiver is also envisaged.

The sequence of signal samples can contain transmitted pilot symbols. The samples corresponding to the pilot channel can then be used together with a known pilot sequence to estimate the channel coefficient. The estimated cell geometry can be used to process data samples received from other (non-pilot) symbols.

In the described embodiment, the transmission channel has a plurality of multipath components. However the invention can also be used in the case of a single multipath coefficient (for example in a narrowband system). It will be appreciated that one channel coefficient may be the result of multiple channel paths arising at approximately equal delays. In such a case it is not possible to distinguish different paths because they will be considered as a single channel tap for the purpose of estimating the channel coefficient.

In the present application, cell geometry is defined as the ratio between the total downlink power received from a serving cell and the sum of intercell interference, that is the total downlink power received from other cells, and thermal noise. In the following described embodiment, a simple algorithm is discussed for estimation of the cell geometry at a mobile terminal receiver in a cellular CDMA system, with particular application to a 3GPP WCDMA system. One advantage of the algorithm is that it is designed to use information that is readily available in a WCDMA receiver, and that it provides as an intermediate result an estimate of the channel orthogonality factor $\beta$.

When equalizer processing is used, provision of an estimation of cell geometry is also advantageous because it allows to compute the interference-plus-noise power at the equalizer input. As is known, the computation of MMSE equalizer coefficients requires an estimate of the variance of the input disturbance. Herein, the term "disturbance" is used to mean any interference or noise which corrupts the desired signal. In a synchronous CDMA cellular system, the required variance of the disturbance at the equalizer input corresponds to the variance (power) of the intercell interference-plus-noise at the equalizer input, which (as is made evident in the following description) is proportional to the inverse of the cell geometry.

Furthermore, the inventors have appreciated that the scenario where channel equalization may not be able to provide superior performance (namely at low signal to interference-plus-noise ratios) can typically correspond to the scenario where the mobile terminal operates near the cell edges, that is at low cell geometry. In this situation, it can be convenient to use the estimated cell geometry to make a decision to switch the receiver processing between channel equalizer and rake receiver. More generally, the availability of an up to date estimate of the cell geometry may allow a dynamic selection of different receiver algorithms and/or the selection of the values of critical receiver design parameters.

For a better understanding of the present invention and to show how the same may be carried into effect, reference will now be made by way of example to the accompanying drawings, in which.

Figure 1:
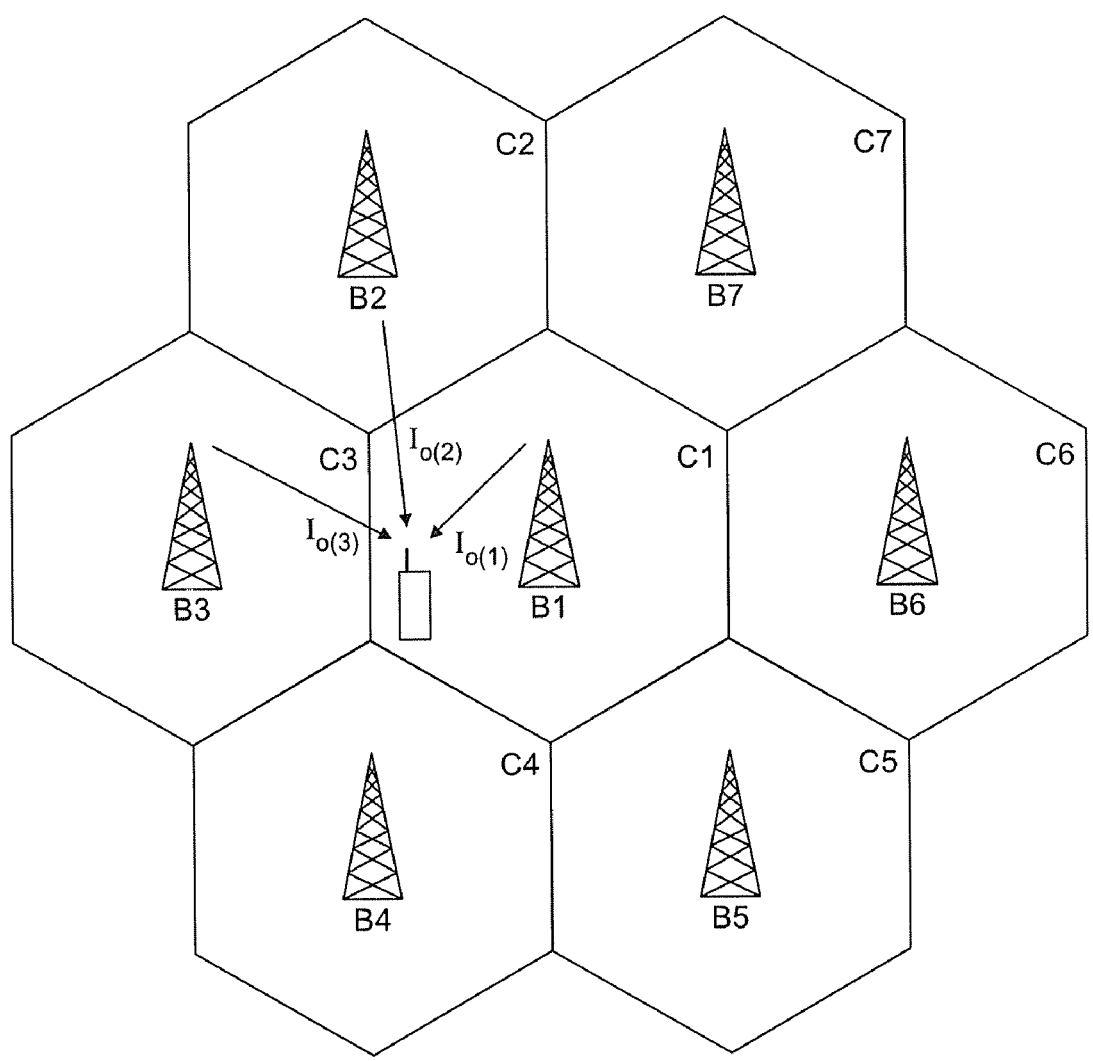
FIG. 1 is a schematic diagram of a wireless cellular network.

FIG. 1 is a schematic diagram of a wireless cellular network. A plurality of adjacent cells are illustrated, shown as being hexagonal but it will be readily appreciated that they could be of any shape. A base station B1 is shown serving cell C1 and potentially interfering with cells C2, C3, . . . , C7, served by base stations B2, B3, . . . , B7, respectively. It will readily be appreciated that there can be a large plurality of base stations and cells, and that base stations can serve any number of cells (including one).

A mobile terminal user equipment UE is shown in cell C1. As is well known, the UE has a transmitter and a receiver for wireless signals. The main signal which the UE is intending to receive is labelled $I_{o(1)}$ to represent the downlink channels from the base station B1. In a WCDMA system, on a given cell, different physical channels are multiplexed in the code domain using separate spreading sequences (OVFS codes as described for example in the 3GPP specification "Technical Specification Group Radio Access Network; Spreading and Modulation (FDD)", TS 25.213, March 2006). In the case of orthogonal spreading code words, the original data symbols can then be effectively separated at the receiver by despreading. The composite signal transmitted from the base station B1 consists of the superposition of these physical channels further modified by multiplication by a pseudo-random scrambling code, which is unique (at least locally) to the cell. This composite signal is received at the user equipment UE after passing through a transmission channel which, if significant multipath components are present, results in a loss of orthogonality that produces multiple-access interference (MAI). The received signal is further corrupted by the addition of thermal noise and transmissions from other cells (for example $I_{o(2)}$ and $I_{o(3)}$). Due to lack of synchronisation and use of different scrambling codes, these interfering signals are not orthogonal to the wanted cell transmissions.

In the following, we denote by $I_{or}$ the total transmit downlink power of the wanted cell at the base station and define $\hat{I}_{or} = \sigma_d^2$ the received downlink power of the wanted cell at the UE, and $I_{oc} = \sigma_n^2$ the received power of the interfering cells plus thermal noise at the UE.

Each cell in the wideband CDMA system transmits a special constant power downlink channel known as the common pilot channel (CPIPH) on a fixed OVSF code (as discussed for example in the 3GPP specification "Technical Specification Group Radio Access Network; Physical Channels and Mapping of Transport Channels onto Physical Channels (FDD)", TS 25.211, December 2005). The CPICH is transmitted with a fixed, predetermined data pattern and can be used for channel estimation and signal-to-interference ratio (SIR) estimation.

Figure 2:
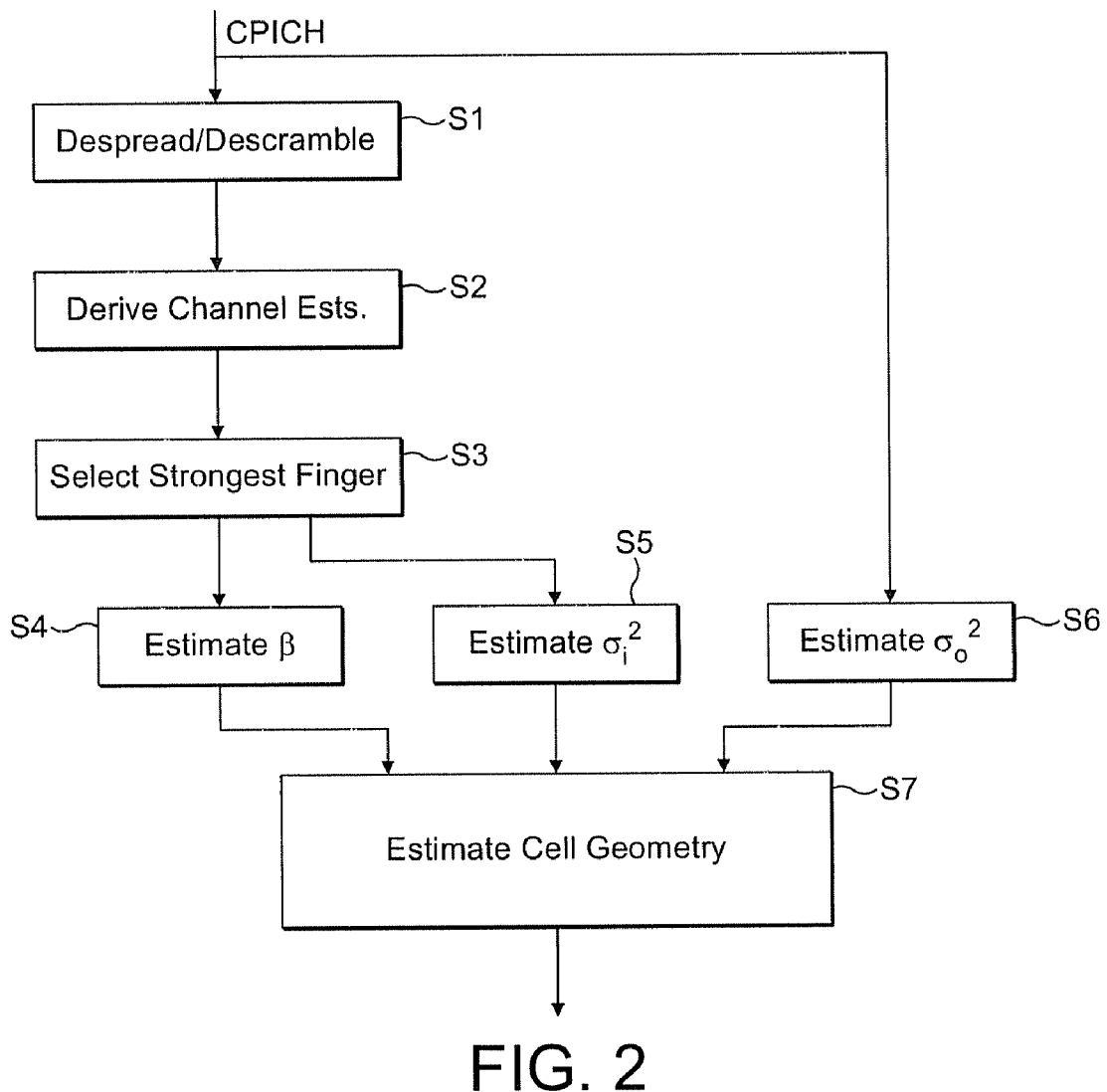
FIG. 2 is a schematic flow chart showing operation of a method of estimating cell geometry.

FIG. 2 is a schematic flow diagram showing the steps in a proposed geometry estimation algorithm.

At step S1, the received CPICH symbols are subject to despreading/descrambling. In a WCDMA receiver, there is a mechanism for rake finger tracking/management, whereby fingers are assigned to significant multipath components. For each multipath component or finger, since the CPICH data is known, a channel estimate $h_l$, $l=0, \ldots, L_0-1$, where $L_0$ is the total number of multipath channel coefficients, can be derived from the despread CPICH symbols as denoted in step S2.

In the following discussion, extensive use is made of the strongest of the rake fingers, that is the one corresponding to the channel delay of the estimated channel tap with the highest power, and this finger is selected at step S3 Nevertheless it will be appreciated that there are other possible implementations which can include the use of more or all the relevant channel delays or fingers, and even implementations that are based on the estimation of the channel coefficients without any connection with a rake receiver.

At step S4, the orthogonality factor $\beta$ is estimated. The orthogonality factor $\beta$ gives the relation between $\hat{I}_{or}$ and MAI. It is established in the following way:

Given a channel estimate $h_l$, $l=0, \ldots, L_0-1$, where $L_0$ is the total number of fingers, denoting by $i$ the index of the strongest rake finger, we define the orthogonality factor $\beta_i$ as $$\beta_i = \frac{\sum_{l=0}^{L_0-1} |h_l|^2 - |h_i|^2}{\sum_{l=0}^{L_0-1} |h_l|^2}$$

i.e., as the ratio of the channel power that is perceived as interference by the strongest finger to the total channel power.

At step S5, an estimation of the noise-plus-interference after descrambling/despreading is made. Although denoted step S5, this could be done in parallel with or prior to step S4 and again is based on the selected finger or fingers in step S3. This is done in the following way.

The received symbols are corrupted by interference due to the non-orthogonal components of the received signal from the wanted cell after passing through the multipath channel, plus the received signals from the other cells together with thermal noise. If we restrict our attention to the interference received on the CPICH symbols despread on the strongest finger, this quantity is given by $$\sigma_i^2 = I^{oc} + \beta_i \hat{I}_{or}.$$

In order to estimate the level of this interference, we compute the variance of the noise power on the CPICH symbols of the strongest finger $$\sigma_i^2 = I_{oc} + \beta_i \hat{I}_{or} =$$

$$\mathrm{Var}\{s_{i,k}\} = E\{|s_{i,k} - E\{s_{i,k}\}|^2\} \approx \frac{1}{N_s-1} \sum_{k=0}^{N_s-1} \left| s_{i,k} - \frac{1}{N_s} \sum_{k=0}^{N_s-1} s_{i,k} \right|^2,$$

where $s_{i,k}$ denotes the k-th despread CPICH symbol on the strongest finger. According to the above equation, in step S5 the statistical mean and variance of the despread CPICH symbols are estimated by computing the sample mean and sample variance of the sequence $s_{i,k}$. However, the approach can be extended to the use of different mean and variance estimators.

Step S6 performs an estimation of the total input power. This is a straight-forward estimation of the quantity $\sigma_o^2 = \hat{I}_{or} + I_{oc}$, on the basis of the composite received chip sequence before despreading. This step can use the received signal samples that are employed for automatic gain control (AGC) computation.

Step S7 denotes the combination of the above parameters to estimate the quantities $I_{oc}$ and/or $\hat{I}_{or}/I_{oc}$ (or its inverse). This is an estimate of the cell geometry as required. The estimation of the intercell interference $I_{oc}$ is implemented as follows:

$$I_{oc} = \frac{\sigma_i^2 - \beta_i \cdot \sigma_o^2}{1 - \beta_i}.$$

From $I_{oc}$ and $\sigma_o^2 = \hat{I}_{or} + I_{oc}$ derived in step S6 we can also compute an estimate of $\hat{I}_{or}/I_{oc}$, for instance as $$\hat{I}_{or}/I_{oc} = \frac{\sigma_o^2 - \sigma_i^2}{\sigma_i^2 - \beta_i \sigma_o^2},$$

or, alternatively, an estimate of $I_{oc}/\hat{I}_{or}$ as $$I_{oc}/\hat{I}_{or} = \frac{\sigma_i^2 - \beta_i \sigma_o^2}{\sigma_o^2 - \sigma_i^2}.$$

Note that it may be desirable to filter the above quantities to obtain reliable estimates.

With regard to step S5, the choice of the averaging period for the computation of $E\{s_{i,k}\}$ can be made dependent on the speed with which the user equipment (mobile terminal) is moving. For low mobile speeds, that is for slowly time varying channels, the CPICH symbol estimate can be improved by using longer averaging periods. However, for high mobile speeds, corresponding to fast time varying propagation channels, if the averaging period is too long the CPICH symbol estimate will lag behind its actual value, thus degrading the geometry estimate.

It may not be desirable to perform the geometry estimation computations continuously, but instead to select intervals over which the computation should be performed. Preferably these intervals should be chosen to avoid times at which automatic gain control values are adjusted, and to avoid any bias in the geometry estimation caused by interference from any non-orthogonal intracell transmissions (such as synchronisation channels in the WCDMA network).

Figure 3:
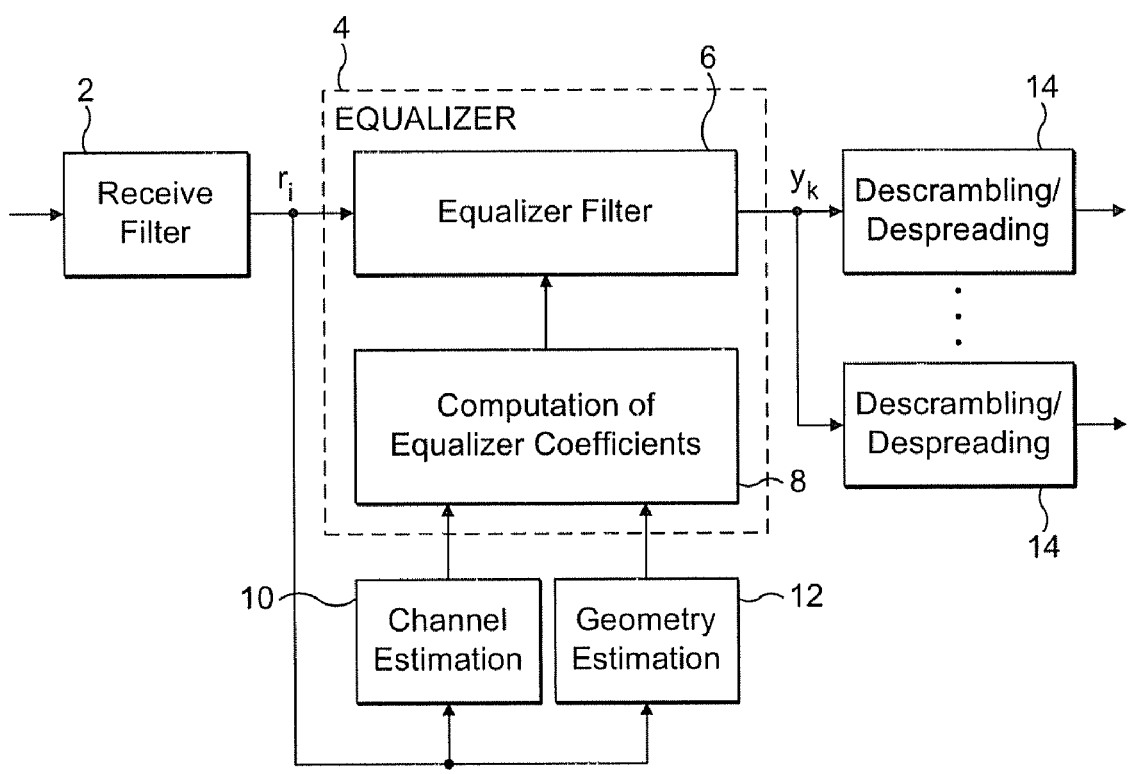
FIG. 3 is a block diagram of an equalizer.

FIG. 3 is a schematic block diagram illustrating how an estimate of cell geometry can be used to compute the equalizer coefficients for use in equalizer processing. Received signal samples are supplied to a receive filter 2 which generates a (possibly oversampled) received sequence $r_i$. This sequence is supplied to an equalizer 4 which comprises an equalizer filter 6 and a computation block 8 for the computation of the equalizer coefficients. The sequence $r_i$ is also used to provide a channel estimation at block 10 and an estimation of cell geometry at block 12. Channel estimation is known per se and is not discussed further herein. Geometry estimation is carried out in a manner described hereinabove. As described more completely in the following, the geometry estimation allows the calculation of optimum MMSE equalizer coefficients to be carried out by the computation block 8. In the case of a WCDMA downlink receiver, the output of the chip level channel equalizer 4, denoted by $y_k$, is supplied to a descrambling/despreading function 14 for each downlink code. A detailed description of the equalizer processing applicable to a synchronous CDMA system is given below.

Consider the discrete-time signal model $$r_i = \sum_n d_n h_{i-nM} + n_i \quad (1)$$

where $r_i = r(iT_c/M)$ are the received signal samples taken at rate $T_c/M$, with $T_c$ denoting the chip interval and M the oversampling ratio, $h_l = h(lT_c/M)$ are the rate $T_c/M$ samples of the complex equivalent channel impulse response, which is assumed stationary for the time interval of interest, $d_n$ represents the complex multi-user transmitted chip sequence, and $n_i = n(iT_c/M)$ is a complex additive Gaussian process, which models thermal noise and intercell interference.

In the model (1), the channel impulse response includes the effect of the transmit and receive equivalent filters, which in the case of a WCDMA receiver are assumed root raised cosine filters with roll-off 0.22. We also assume that the channel impulse response samples $h_l$ are appreciably different from zero only for l=0, ..., LM−1, and that the channel is normalized so that its average energy is equal to 1. The noise samples $n_i$ are assumed to derive from an additive white Gaussian intercell interference-plus-noise process $v_i = v(iT_c/M)$ with zero mean and variance $\sigma_n^2$, filtered by a low-pass filter with impulse response $g_l = g(lT_c/M)$ representing the equivalent receive filter, which in the case of a WCDMA receiver is a root raised cosine filter with roll-off 0.22.

The oversampled sequence $r_i$ can be decomposed into M chip rate subsequences relative to M distinct subchannels. In vector notation, we define for the k-th chip interval $$r_k^{(m)} = [r_{kM+m} r_{(k+1)M+m} \ldots r_{(k+N-1)M+m}]^T, m=0, \ldots, M-1 \quad (2)$$

where $(\cdot)^T$ indicates vector transpose. From equations (1) and (2), we also write $$r_k^{(m)} = H^{(m)} d_k + n_k^{(m)}, m=0, \ldots, M-1 \quad (3)$$

with $d_k = [d_{k-L+1} \ldots d_k \ldots d_{k+N-1}]^T$, $$H^{(m)} = \begin{bmatrix} h_{L-1}^{(m)} & h_{L-2}^{(m)} & \cdots & h_0^{(m)} & 0 & \cdots & 0 \\ 0 & h_{L-1}^{(m)} & \cdots & h_1^{(m)} & h_0^{(m)} & \cdots & 0 \\ \vdots & \vdots & \ddots & \vdots & \vdots & \ddots & \vdots \\ 0 & 0 & \cdots & 0 & 0 & \cdots & h_0^{(m)} \end{bmatrix}^T \quad (4)$$

where $h_l^{(m)} = h_{lM+m}$, and $n_k^{(m)} = [n_{kM+m} n_{(k+1)M+m} \ldots n_{(k+N-1)M+m}]^T$. Denoting by $w_k^{(m)} = [w_{kM+m} w_{(k+1)M+m} \ldots w_{(k+N-1)M+m}]^T$ the N-dimensional vector of the equalizer coefficients relative to the m-th subchannel, the equalizer output at time k can then be written as $$y_k = y(kT_c) = \sum_{\ell=0}^{MN-1} w_\ell r_{k-\ell} = w_k^{(0)T} r_k^{(0)} + \ldots + w_k^{(M-1)T} r_k^{(M-1)}. \quad (5)$$

Define the MN×1 vectors $w_k = [w_k^{(0)T} \ldots w_k^{(M-1)T}]^T$, $r_k = [r_k^{(0)T} \ldots w_k^{(M-1)T}]^T$, and $n_k = [n_k^{(0)T} \ldots n_k^{(M-1)T}]^T$, and introduce the MN×(N+L−1) channel matrix $H = [H^{(0)T} \ldots H^{(M-1)T}]^T$. With this notation, we have $$r_k = H d_k + n_k \quad (6)$$

and the output of the chip-level channel equalizer results $$y_k = w_k^T r_k. \quad (7)$$

This signal is a composite chip rate sequence, which is then further processed to separately descramble and despread the data associated to the different downlink codes.

The above equalizer model corresponds to a Baud-spaced linear equalizer for M=1, and to a fractionally-spaced linear equalizer with $T_c/M$ spaced coefficients for M>1. Note that the model also formalizes the operation of a receive diversity equalizer, in the case where all or some of the M chip-rate subchannels correspond to the signal samples obtained from multiple receive antennas.

A common strategy for the computation of the MN equalizer coefficients of the vector $w_k$ is based on the minimization of the Mean-Square Error (MSE) at the equalizer output.

In the case of a block linear equalizer as described for example in [2], the optimum vector $w_{k(opt)}$ according to the Minimum Mean-Square Error (MMSE) criterion is obtained as $$w_{k(opt)} = \underset{w_k}{\arg\min} E\{|w_k^T r_k - d_{k+D}|^2\}, \quad (8)$$

where $E\{\cdot\}$ denotes statistical expectation and D is the overall delay at the equalizer output. From equation (8) straightforward calculation gives $$w_{k(opt)} = E\{r_k^* r_k^T\}^{-1} E\{r_k^* d_{k+D}\} = \left(H^* H^T + \frac{1}{\sigma_d^2} C_{nn}\right)^{-1} h_{k+D}^* \quad (9)$$

where $(\cdot)^*$ denotes complex conjugation, $\sigma_d^2 = E\{|d_k|^2\}$ is the variance of the transmitted composite chip sequence, $C_{nn} = E\{n_k^* n_k^T\}$ is the noise-plus-interference covariance matrix, and $h_{k+D}$ indicates the MN×1 column of the channel matrix H corresponding to the multi-user chip $d_{k+D}$.

The calculation of the optimum MMSE equalizer coefficients requires the availability of an estimate of the channel matrix H and of the noise covariance matrix $C_{nn}$. In a WCDMA receiver, channel estimation can be performed based on the downlink common pilot symbols in a manner know per se. For the calculation of the noise covariance matrix, denoting by G the receive filter matrix we have $$C_{nn} = \sigma_n^2 G^* G^T. \quad (10)$$

Since the receive filter is part of the receiver design, it is possible to precompute and store the matrix $G^*G^T$ to be used in (10). Note that, if the receive filter frequency response is the exact square root of a Nyquist filter response (i.e., of a filter response that satisfies the Nyquist criterion, then $G^*G^T = I$ and from (10) we have $C_{nn} = \sigma_n^2 I$.

Based on (10), equation (9) can be rewritten as $$w_{k(opt)} = \left( H^* H^T + \frac{\sigma_n^2}{\sigma_d^2} G^* G^T \right)^{-1} h^*_{k+D}. \quad (11)$$

After estimation of the channel response, the only additional parameter to be estimated in (11) is the ratio between the input intercell interference-plus-noise variance $\sigma_n^2$ and the composite chip sequence variance $\sigma_d^2$, which corresponds to the inverse of the cell geometry, estimated above.

In order to avoid the calculation of the matrix inverse required by (11), the computation of the equalizer coefficients may be alternatively performed in the frequency domain. Denote by $W_k$, $H_k$ and $N_k$, $k=0, \ldots, N_f-1$ the Fourier transform of the equalizer coefficients $w_l$, the sampled equivalent channel impulse response $h_l$ and the noise autocorrelation function, respectively. Then, for an MMSE frequency domain equalizer, one obtains the frequency domain equalizer coefficients $$W_{k(opt)} = \frac{H_k^*}{|H_k|^2 + \frac{1}{\sigma_d^2} N_k}, \quad (12)$$

as described for example in [10]. In this case, equalization of a block of data is performed by computing the Fourier transform of the received signal samples (1), multiplying the frequency domain signal by the frequency domain equalizer coefficients $W_k$, and finally computing the inverse Fourier transform of the resulting frequency domain equalized signal. The operations of Fourier transform and inverse Fourier transform can be efficiently implemented by means of $N_f$-point Fast Fourier Transform (FFT) and Inverse Fast Fourier Transform (IFFT).

If the interference-plus-noise samples at the input of the receive filter are modelled as a white Gaussian process with zero mean and variance $\sigma_n^2$, then denoting by $G_k$, $k=0, \ldots, N_f-1$ the Fourier transform of the sampled receive filter impulse response $g_l$, one has $$N_k = \sigma_n^2 |G_k|^2 \quad (13)$$

and (12) becomes $$W_{k(opt)} = \frac{H_k^*}{|H_k|^2 + \frac{\sigma_n^2}{\sigma_d^2} |G_k|^2}, \quad (14)$$

where $|G_k|^2 = 1$ for $k=0, \ldots, N_f-1$ if the receive filter impulse response is the exact square-root of a Nyquist filter response.

It is worth noting that in a CDMA system the quantity $\sigma_n^2/\sigma_d^2$ can vary over time—e.g., in the case of a mobile driving within the cell coverage area. Therefore, an up-to date estimate of the cell geometry is desirable to be able to accurately compute the coefficients of the chip-level MMSE equalizer coefficients. In the absence of a method for estimation of the quantity $\sigma_n^2/\sigma_d^2$, it would be necessary to use a fixed parameter, which will cause a degradation of the MSE performance at the output of the equalizer, depending on the deviation with respect to the actual value of $\sigma_n^2/\sigma_d^2$.

The invention claimed is:

1. A method of processing signals received over a wireless communication channel by a receiver in a wireless cellular network, the method comprising:
   receiving a sequence of signal samples;
   using the received sequence of samples to estimate at least one channel coefficient for at least one transmission path of the signal;
   generating an estimate of an orthogonality factor (β) based on said at least one channel coefficient;
   generating an estimate of the disturbance ($\sigma_i^2$) on said at least one estimated channel coefficient;
   generating an estimate of input signal power ($\sigma_o^2$) using the received sequence;
   using the estimated orthogonality factor, estimated disturbance and estimated input signal power to generate an estimate of cell geometry; and
   using the estimate of cell geometry in processing received data samples.

2. A method according to claim 1, wherein the step of receiving the sequence of signal samples comprises receiving said samples containing transmitted pilot symbols in the signal.

3. A method according to claim 1 or 2, wherein the transmission channel comprises a plurality of multipath components, and wherein at least one channel coefficient is estimated from the plurality of multipath components.

4. A method according to claim 3, comprising the step of selecting the coefficient of at least one of said multipath components for use as said at least one channel coefficient.

5. A method according to claim 4, wherein the step of selecting said at least one channel coefficient, selects the coefficient for the highest power multipath component.

6. A method according to claim 4 or 5, wherein the step of generating an estimate of an orthogonality factor generates the orthogonality factor $\beta_i$ in accordance with the following:

$$\beta_i = \frac{\sum_{\ell=0}^{L_0-1} |h_\ell|^2 - |h_i|^2}{\sum_{\ell=0}^{L_0-1} |h_\ell|^2}$$

where $h_l$ is a channel estimate, $L_0$ is the number of multipath coefficients and $h_i$ is the channel estimate of the selected channel coefficient.

7. A method according to claim 1, wherein the wireless cellular network comprises a plurality of cells including a wanted cell in which the receiver is located and interfering cells, where the step of generating an estimate of the input signal power comprises generating the sum of received downlink power at the receiver of the wanted cell and received power of the interfering cells plus thermal noise at the receiver in the wanted cells using the received signal samples.

8. A method according to claim 7, wherein the received signal samples which are used in the step of generating an estimate of input signal power are also used in automatic gain control computation.

9. A method according to claim 1, wherein the step of using the estimate of cell geometry in processing received data samples comprises selecting one of a plurality of processing routines for processing the digital samples.

10. A method according to claim 9, wherein the plurality of processing routines include a rake processing routine and an equaliser processing routine.

11. A method according to claim 1, wherein the step of using the estimate of cell geometry in processing received data samples comprises using an inverse of the estimate to calculate equaliser coefficients for an equaliser algorithm for implementing equaliser processing based on minimisation of mean square error (MMSE).

12. A receiver for use in a wireless cellular network comprising:
    means for receiving a sequence of signal samples corresponding to symbols;
    means for estimating at least one channel coefficient from the received sequence of samples for at least one transmission path of the signal;
    means for generating an estimate of cell geometry, said cell geometry estimation means being operable to:
        generate an estimate of an orthogonality factor ($\beta$) based on said at least one channel coefficient;
        generate an estimate of the disturbance ($\sigma_i^2$) on said at least one estimated channel coefficient;
        generate an estimate of input signal power ($\sigma_o^i$) using the received sequence;
        to generate an estimate of cell geometry using the estimated orthogonality factor, estimated disturbance and estimated input signal power; and
    means for using the estimate of cell geometry to process received data samples.

13. A receiver according to claim 12, wherein the processing means comprises a processor arranged to execute one of a plurality of processing routines.

14. A receiver according to claim 12 or 13, comprising a memory holding a plurality of processing routines for execution by the processing means.

15. A mobile terminal comprising a wireless interface for receiving signals and providing said signal samples to a receiver in accordance with any of claims 12 to 14.

16. A receiver for use in a wireless cellular network for processing digital samples, the receiver comprising:
    a processor arranged to receive a sequence of digital samples corresponding to symbols transmitted in a cell of the wireless network and for implementing a cell geometry estimation routine which uses the received sequence to generate an estimate of cell geometry, being an estimate of the ratio between received signal power of signals of that cell and disturbance power where disturbance power is a measure of disturbance introduced from signals of other cells and noise, and one of a plurality of processing routines for processing the digital samples;
    a memory holding said plurality of processing routines;
    wherein the processing implements a routine which uses said estimate of cell geometry to select one of the plurality of processing routines in the memory for processing the digital samples.

* * * * *